(12) United States Patent
Shi et al.

(10) Patent No.: US 12,523,876 B2
(45) Date of Patent: Jan. 13, 2026

(54) IMAGING LIGHT PATH AND HEAD MOUNTED DISPLAY

(71) Applicant: GOERTEK OPTICAL TECHNOLOGY CO., LTD, Shandong (CN)

(72) Inventors: Chaiyuan Shi, Shandong (CN); Wenbao Song, Shandong (CN)

(73) Assignee: GOERTEK OPTICAL TECHNOLOGY CO., LTD, Shandong (CN)

( * ) Notice: Subject to any disclaimer, the term of this patent is extended or adjusted under 35 U.S.C. 154(b) by 370 days.

(21) Appl. No.: 18/247,044

(22) PCT Filed: Dec. 2, 2021

(86) PCT No.: PCT/CN2021/135123
§ 371 (c)(1),
(2) Date: Mar. 28, 2023

(87) PCT Pub. No.: WO2022/135106
PCT Pub. Date: Jun. 30, 2022

(65) Prior Publication Data
US 2024/0027769 A1    Jan. 25, 2024

(30) Foreign Application Priority Data
Dec. 21, 2020    (CN) .......................... 202011532252.0

(51) Int. Cl.
*G02B 27/01*      (2006.01)

(52) U.S. Cl.
CPC .............................. *G02B 27/0172* (2013.01)

(58) Field of Classification Search
CPC .......................... G02B 27/0172; G02B 27/283
See application file for complete search history.

(56) References Cited

U.S. PATENT DOCUMENTS

| 10,520,734 B1 | 12/2019 | Chan et al. |
| 2018/0107000 A1 | 4/2018 | Sung et al. |

(Continued)

FOREIGN PATENT DOCUMENTS

| CN | 106707510 A | 5/2017 |
| CN | 107065180 A | 8/2017 |

(Continued)

*Primary Examiner* — James C. Jones
(74) *Attorney, Agent, or Firm* — Ingrassia Fisher & Lorenz, LLP (57) ABSTRACT

An imaging light path includes a display screen and a glued lens group. The display screen emits an imaging light ray. The glued lens group is disposed in the exit direction of the imaging light ray. The glued lens group comprises a first lens and a second lens. The first lens and the second lens are arranged successively along the propagation direction of the imaging light ray. The surface of the first lens facing the display screen is a first surface, and the first surface bulges toward the display screen. The first surface is provided thereon with a semi-reflective and semi-transmissive film. A glued film layer is provided between the first lens and the second lens. The glued film layer comprises a quarter wave plate and a reflective polarizing film arranged successively along the propagation direction of the imaging light ray.

17 Claims, 11 Drawing Sheets

(56) References Cited

U.S. PATENT DOCUMENTS

| | | | |
|---|---|---|---|
| 2020/0132994 A1 | 4/2020 | Niu et al. | |
| 2020/0166738 A1* | 5/2020 | Khan | G02B 27/283 |
| 2023/0168501 A1 | 6/2023 | Yang et al. | |

FOREIGN PATENT DOCUMENTS

| | | |
|---|---|---|
| CN | 208607440 A | 3/2019 |
| CN | 209311805 U | 8/2019 |
| CN | 110268301 A | 9/2019 |
| CN | 209496201 U | 10/2019 |
| CN | 110456509 A | 11/2019 |
| CN | 209858857 U | 12/2019 |
| CN | 110827711 A | 2/2020 |
| CN | 111240022 A | 6/2020 |
| CN | 111929906 A | 11/2020 |
| CN | 212111989 U | 12/2020 |
| CN | 112596240 A | 4/2021 |
| GB | 0209362 A | 10/2003 |
| WO | 2002099508 A1 | 12/2002 |
| WO | 2008089417 A2 | 7/2008 |

* cited by examiner

FIG. 13

IMAGING LIGHT PATH AND HEAD MOUNTED DISPLAY

CROSS-REFERENCE TO RELATED APPLICATIONS

This Application is a U.S. National-Stage entry under 35 U.S.C. § 371 based on International Application No. PCT/CN2021/135123, filed Dec. 2, 2021 which was published under PCT Article 21(2) and which claims priority to Chinese Application No. 202011532252.0, filed Dec. 21, 2020, which are all hereby incorporated herein in their entirety by reference.

TECHNICAL FIELD

This application pertains to the technical field of near-eye display, in particular to an imaging light path and a head mounted display.

BACKGROUND

In the current virtual reality equipment, light rays from the display screen are usually transmitted and amplified by the imaging system and then transmitted to the human eye. In order to achieve image amplification, the imaging system usually needs a combination of multiple lenses.

Multiple lenses are designed to be separate. There are gaps between lenses. Dust in the external environment enters the imaging system via the gaps between lenses and is deposited on the surface of the lens. The deposited dust will affect the smooth passage of light rays, which will result in the loss of the formed image of the imaging system or the low brightness of the formed image. In addition, other objects, desirable features and characteristics will become apparent from the subsequent summary and detailed description, and the appended claims, taken in conjunction with the accompanying drawings and this background.

SUMMARY

Thus, with respect to the problem that the deposited dust on the surface of the lens affects the smooth passage of light rays, and results in the loss of the formed image of the imaging system or the low brightness of the formed image, it is necessary to provide an imaging light path and a head mounted display, which can reduce dust deposition on the surface of the lens, so that the light can pass through the lens smoothly, thereby avoiding the loss of the formed image and ensuring the brightness of the formed image.

To achieve the above object, an imaging light path proposed in the present disclosure. The imaging light path comprises:

a display screen emitting an imaging light ray; and a glued lens group disposed in an exit direction of the imaging light ray;

wherein the glued lens group comprises a first lens and a second lens arranged successively along a propagation direction of the imaging light ray;

a surface of the first lens facing the display screen is a first surface, and the first surface bulges toward the display screen;

the first surface is provided thereon with a semi-reflective and semi-transmissive film, a glued film layer is provided between the first lens and the second lens, and the glued film layer comprises a quarter wave plate and a reflective polarizing film arranged successively along the propagation direction of the imaging light ray.

Optionally, a surface of the first lens facing away from the display screen is a second surface, and the quarter wave plate is provided on the second surface;

a surface of the second lens facing the first lens is a third surface, the glued film layer further comprises a polarizing film, the polarizing film is provided on the third surface, and the reflective polarizing film is provided on a side of the polarizing film facing the first lens.

Optionally, a surface of the second lens facing away from the first lens is a fourth surface, and at least one of the second surface, the third surface and the fourth surface is provided thereon with an anti-reflection film.

Optionally, at least one of the first surface and the fourth surface is an aspherical surface.

Optionally, the second surface and the third surface have a same shape.

Optionally, the second surface and the third surface are flat surfaces, a focal power of the first lens is defined as $\varphi 1$ and satisfies $0<\varphi 0.06$, a focal power of the second lens is defined as $\varphi 2$ and satisfies $-0.01<\varphi 2<0$, a thickness of the first lens is defined as T1 and satisfies 2.0 mm <T1 <8.0 mm, a thickness of the second lens is defined as T2 and satisfies 2.0 mm <T2 <5.0 mm, and the imaging light path has an optical distortion less than 30%, a chromatic aberration less than 70 μm and an angle of view greater than 90°.

Optionally, the second surface and the third surface are aspherical surfaces, the second surface and the third surface bulge toward the display screen, a focal power of the first lens is defined as $\varphi 3$ and satisfies $0<\varphi 3<0.1$, a focal power of the second lens is defined as $\varphi 4$ and satisfies $0<\varphi 4<0.005$, a thickness of the first lens is defined as T3 and satisfies 2.0 mm <T3<5.0 mm, a thickness of the second lens is defined as T4 and satisfies 2.0 mm<T4<8.0 mm, and the imaging light path has a chromatic aberration less than 190 μm and an angle of view greater than 100°.

Optionally, the glued film layer further comprises a glued layer, and the glued layer is disposed between the quarter wave plate and the reflective polarizing film.

Optionally, the imaging light path further comprises a calibration assembly, wherein the calibration assembly is connected to the glued lens group and configured to adjust a distance between the glued lens group and the display screen.

In addition, in order to achieve the above object, the present disclosure also provides a head mounted display. The head mounted display comprises a housing and an imaging light path as described above, and the imaging light path is disposed in the housing.

In the technical solution proposed in the present disclosure, the display screen emits the imaging light ray. The imaging light ray passes through the glued lens group. The glued lens group comprises the first lens and the second lens, and the imaging light ray passes through the first lens and the second lens successively. The first surface of the first lens is provided thereon with a semi-reflective and semi-transmissive film, and a glued film layer is provided between the first lens and the second lens. The glued film layer comprises the quarter wave plate and the reflective polarizing film. After the imaging light ray is emitted from the display screen, when the imaging light ray passes through the semi-reflective and semi-transmissive film, part of the imaging light ray is reflected and part of the imaging light ray is transmitted. The imaging light ray passing through the semi-reflective and semi-transmissive film passes through the first lens. The imaging light ray enters the quarter wave plate. Under the action of the quarter wave plate, the polarization state of the imaging light ray changes from circular polarization to linear polarization. The imaging light ray in the linear polarization state enters the reflective polarizing film. At this point, the polarization transmission direction of the reflective polarizing film is different from the polarization direction of the imaging light ray in the linear polarization state, and the imaging light ray cannot pass through the reflective polarizing film and is reflected back to the quarter wave plate by the reflective polarizing film. After the imaging light ray passes through the quarter wave plate, the linear polarization state changes back to the circular polarization state again, and then it travels toward the semi-reflective and semi-transmissive film. The imaging light ray is reflected and transmitted again on the surface of the semi-reflective and semi-transmissive film. Part of the imaging light ray is reflected and travels to the quarter wave plate again, and the imaging light ray in the linearly polarized state is generated again. After two times of reflection, the polarization angle of the imaging light ray in the linearly polarized state changes. At this point, the polarization direction of the imaging light ray is the same as that of the polarization reflective film, and the imaging light ray passes through the polarization reflective film, and form an image at the position of a user's eyes.

It can be seen that the imaging for display is mainly conducted by the glued lens group, and the first lens and the second lens are glued together without an air gap formed therebetween, so the dust in the external environment is difficult to enter between the first lens and the second lens. As a result, the dust is difficult to deposit on the surface of the first lens or the second lens, thereby ensuring the smooth passage of the imaging light ray, reducing the impact of the dust on the imaging system, avoiding the loss of the formed image, and making the formed image brighter.

BRIEF DESCRIPTION OF DRAWINGS

The present invention will hereinafter be described in conjunction with the following drawing figures, wherein like numerals denote like elements, and.

In the drawings: 10, display screen; 110, imaging light ray; 20, glued lens group; 210, first lens; 211, first surface; 212, second surface; 220, second lens; 221, third surface; 222 fourth surface; 30, glued film layer; 310, quarter wave plate; 320, glued layer; 330, reflective polarizing film; 340, polarizing film; 40, protection plate.

The realization of the object, functional features and advantages of the present disclosure will be further described in conjunction with embodiments with reference to the drawings.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

It should be noted that all directional indications (such as up, down, left, right, front, back, etc.) in the embodiments of the present disclosure are only used to explain the relative positional relationship, the movement situation, etc. among various components under a certain posture (as shown in the accompanying drawings). If the specific posture changes, the directional indication will also change accordingly.

In addition, in the present disclosure, the terms "first" and "second" are used for descriptive purposes only and are not to be construed as indicating or implying relative importance or implicitly indicating the number of indicated technical features. Thus, a feature with "first" or "second" may explicitly or implicitly include at least one such a feature. In the description of the present disclosure, "a plurality of" means at least two, such as two, three, etc., unless expressly defined otherwise.

In the present disclosure, unless otherwise expressly specified and defined, the terms "connected", "fixed" and the like should be understood in a broad sense, for example, it may be fixedly connected, or removably connected, or integrally connected; it may also be mechanically connected or electrically connected; it may also be directly connected or indirectly connected through a middleware; it may also be internally communicated or interacted between two components. For a person of ordinary skill in the art, the specific meaning of these terms in the present disclosure should be understood according to specific situations.

In addition, the technical solutions in various embodiments of the present disclosure can be combined with each other if their combination is realizable to a person of ordinary skill in the art. When the combination of technical solutions is contradictory or cannot be realized, it should be considered that such a combination of technical solutions does not exist and is not within the scope of protection claimed in the present disclosure.

Multiple lenses in the imaging system that realize the light path transmission are designed to be separate. There are gaps between lenses. The dust in the external environment is deposited on the surface of the lens, and will affect the smooth passage of light rays, which will result in the loss of the formed image of the imaging system or the low brightness of the formed image.

Figure 1:
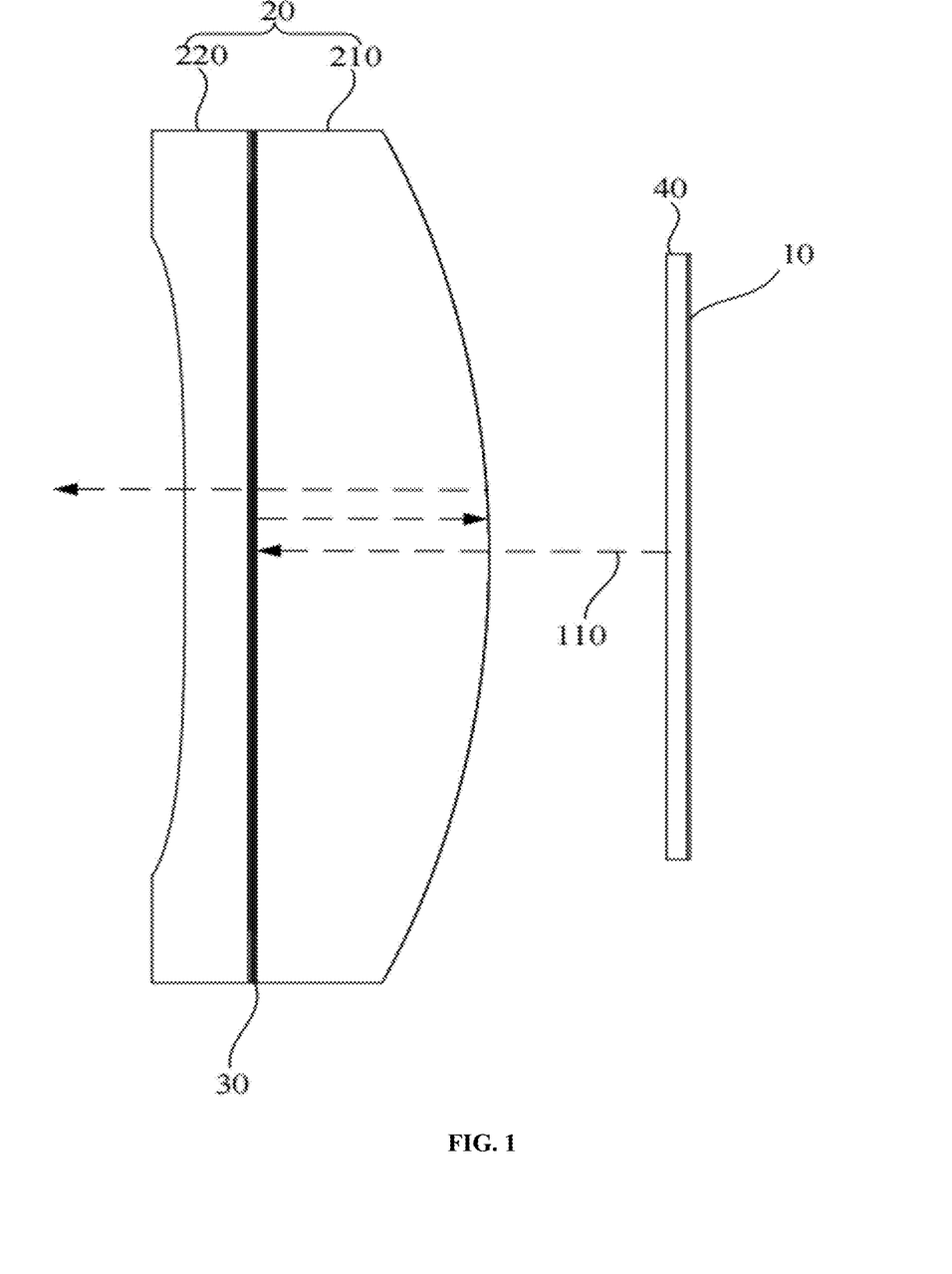
FIG. 1 is a schematic diagram of the structure of an embodiment of an imaging light path according to the present disclosure.

In order to solve the above problem, as shown in FIG. 1, the present disclosure provides an imaging light path, which can be applied to a head mounted display. There are many kinds of display principles of the head mounted display, such as VR (Virtual Reality) display principle and AR (Augmented Reality) display principle.

The imaging light path comprises: a display screen 10 and a glued lens group 20. The display screen 10 emits an imaging light ray 110. The glued lens group 20 is disposed in an exit direction of the imaging light ray 110, and is configured to complete the amplification and transmission of the image formed on the display screen 10. The lenses in the glued lens group 20 are glued together with little or no spacing or gap between them, so it is difficult for outside dust to enter the glued lens group 20. The glued lens group 20 comprises a first lens 210 and a second lens 220 that are arranged successively along the propagation direction of the imaging light ray 110. It can be seen that the first lens 210 and the second lens 220 are also glued together, and it is difficult for outside dust to enter between the first lens 210 and the second lens 220. The surface of the first lens 210 facing the display screen 10 is the first surface 211, and the first surface 211 bulges toward the display screen 10. The image formed on the display screen 10 needs to be amplified and transmitted. The imaging light ray will diverge after being emitted from the display screen, and the convex setting of the first surface 211 can play the role of converging the imaging light ray 110, so that the imaging light ray can effectively converge to the human eye.

Figure 2:
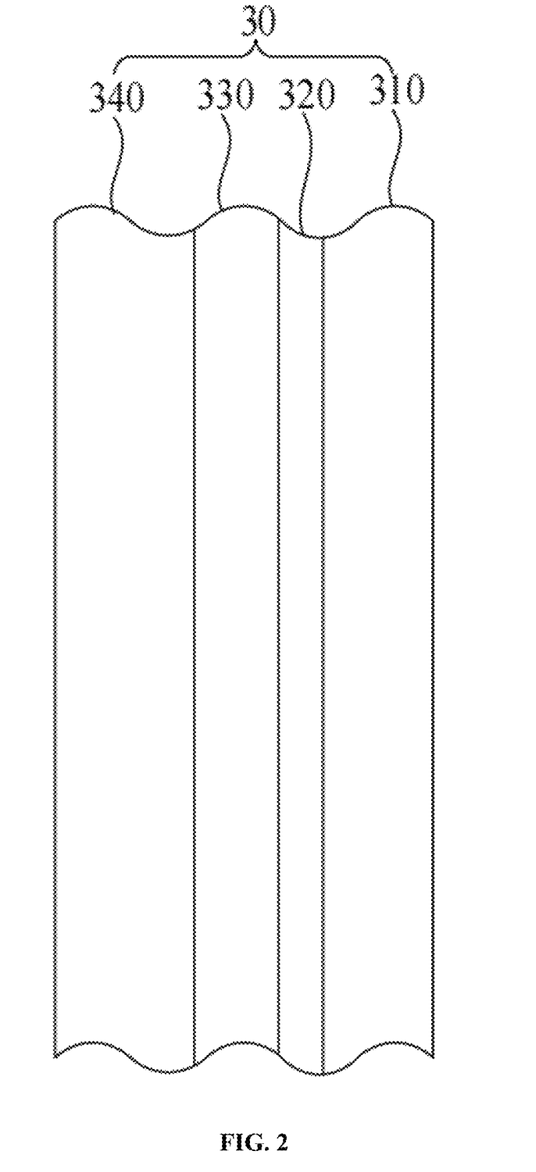
FIG. 2 is a schematic diagram of the structure of the glued film layer in FIG. 1.

The first surface 211 is provided thereon with a semi-reflective and semi-transmissive film, and a glued film layer 30 is provided between the first lens 210 and the second lens 220. The glued film layer 30 comprises a quarter wave plate 310 and a reflective polarizing film 330 arranged successively along the propagation direction of the imaging light ray 110. When the imaging light ray 110 passes through the semi-reflective and semi-transmissive film, a part of the light ray reflects and the other part transmits. The quarter wave plate 310 can convert the polarization state of the imaging light ray 110, for example, convert a linearly polarized light ray to a circularly polarized light ray or visa versa. The reflective polarizing film 330 has a polarization transmission direction. When the imaging light ray 110 vibrates along the polarization transmission direction, it can pass through the reflective polarizing film 330 smoothly. When the imaging light ray 110 vibrating in other directions reaches the reflective polarizing film 330, it will be reflected. The reflective polarizing film 330 and the quarter wave plate 310 may be provided by plating or by gluing. The gluing method is easier to operate, while the plating method can fix more firmly.

Further, the light exit surface of the display screen 10 is also provided with a protective plate 40, which may be transparent glass or transparent plastic. The protective plate 40 is mainly used to protect the display screen 10 and prevent the light exit surface of the display screen 10 from being damaged by external forces.

In the technical solution proposed in the present disclosure, the display screen 10 emits the imaging light ray 110. The imaging light ray 110 passes through the glued lens group 20. The glued lens group 20 comprises the first lens 210 and the second lens 220, and the imaging light ray 110 passes through the first lens 210 and the second lens 220 successively. The first surface 211 of the first lens 210 is provided thereon with a semi-reflective and semi-transmissive film, and a glued film layer 30 is provided between the first lens 210 and the second lens 220. The glued film layer 30 comprises the quarter wave plate 310 and the reflective polarizing film 330. After the imaging light ray 110 is emitted from the display screen 10, when the imaging light ray 110 passes through the semi-reflective and semi-transmissive film, part of the imaging light ray 110 is reflected and part of the imaging light ray 110 is transmitted. The imaging light ray 110 passing through the semi-reflective and semi-transmissive film passes through the first lens 210. The imaging light ray 110 enters the quarter wave plate 310. Under the action of the quarter wave plate 310, the polarization state of the imaging light ray 110 changes from circular polarization to linear polarization. The imaging light ray 110 in the linear polarization state enters the reflective polarizing film 330. At this point, the polarization transmission direction of the reflective polarizing film 330 is different from the polarization direction of the imaging light ray 110 in the linear polarization state, and the imaging light ray 110 cannot pass through the reflective polarizing film 330 and is reflected back to the quarter wave plate 310 by the reflective polarizing film 330. After the imaging light ray 110 passes through the quarter wave plate 310, the linear polarization state changes back to the circular polarization state again, and then it travels toward the semi-reflective and semi-transmissive film. The imaging light ray 110 is reflected and transmitted again on the surface of the semi-reflective and semi-transmissive film. Part of the imaging light ray 110 is reflected and travels to the quarter wave plate 310 again, and the imaging light ray 110 in the linearly polarized state is generated again. After two times of reflection, the polarization angle of the imaging light ray 110 in the linearly polarized state changes. At this point, the polarization direction of the imaging light ray 110 is the same as that of the polarization reflective film 330, and the imaging light ray 110 passes through the polarization reflective film 330, and form an image at the position of a user's eyes.

It can be seen that the imaging for display is mainly conducted by the glued lens group 20, and the first lens 210 and the second lens 220 are glued together without an air gap formed therebetween, so the dust in the external environment is difficult to enter between the first lens 210 and the second lens 220. As a result, the dust is difficult to deposit on the surface of the first lens 210 or the second lens 220, thereby ensuring the smooth passage of the imaging light ray 110, reducing the impact of the dust on the imaging system, avoiding the loss of the formed image, and making the formed image brighter.

In the above embodiment, when the polarization direction of the imaging light ray 110 and the polarization transmission direction of the reflective polarizing film 330 are the same, the imaging light ray 110 is transmitted; when they are vertical to each other, the imaging light ray 110 is reflected. Besides these two cases, there may be a case that they form an angle ranging from 0° to 90°. Namely, the polarization direction of the imaging light ray 110 and the polarization transmission direction of the reflective polarizing film 330 are in a state between same and vertical. In this case, part of light ray will be transmitted through the reflective polarizing film 330, and thus stray light will appear. To reduce stray light, the surface of the first lens 210 facing away from the display screen 10 is defined as the second surface 212, and the quarter wave plate 310 is provided on the second surface 212; the surface of the second lens 220 facing the first lens 210 is defined as the third surface 221, and the glued film layer 30 further comprises a polarizing film 340 provided on the third surface 221, and the reflective polarizing film 330 is provided on the side of the polarizing film 340 facing the first lens 210. It can be seen from this that the imaging light ray 110 travels toward the polarizing film 340 after passing through the polarizing reflection film 330. The polarizing film 340 is also called a polarizer or polarizing plate, and can eliminate stray light, and thus can ensure the imaging quality of the imaging light ray 110. The polarizing film 340 can be provided on the third surface 221 by plating or by gluing. The gluing method is easier to operate, while the plating method can make the film layer firmer.

Figure 3:
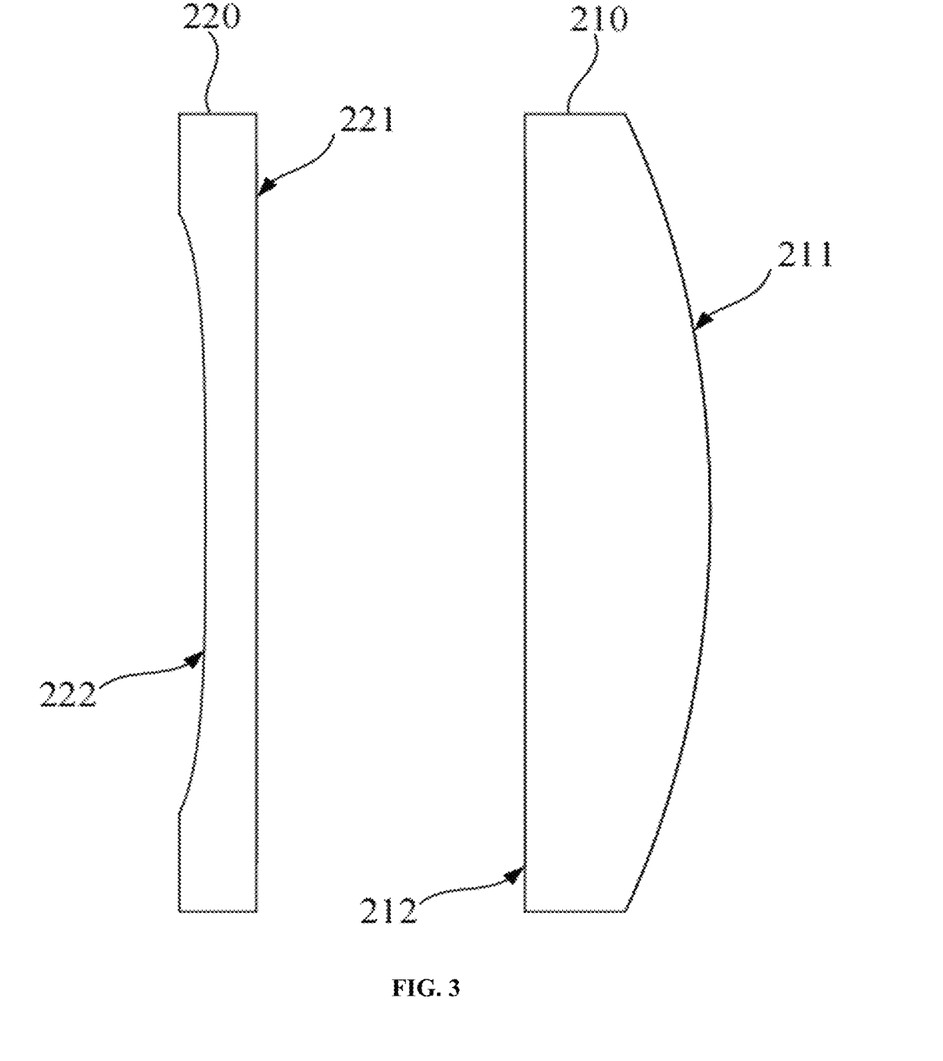
FIG. 3 is a schematic diagram of the structure of a first lens and a second lens in FIG. 1.

In the above embodiment, the imaging light ray 110 is easy to lose when it is propagated in the air or the lens, resulting in a decrease in the brightness of the formed image. For this reason, the surface of the second lens 220 facing away from the first lens 210 is defined as the fourth surface 222, and at least one of the second surface 212, the third surface 221, and the fourth surface 222 is provided thereon with an anti-reflection film. By providing the anti-reflection film, the transmission quantity of the imaging light ray 110 can be increased and the light loss can be reduced. In order to maximize the amount of the imaging light ray 110 transmitted, the second surface 212, the third surface 221, and the fourth surface 222 may be all provided with anti-reflection films. Alternatively, the anti-reflection film may be provided on one of the second surface 212, the third surface 221 and the fourth surface 222, which can reduce the processing cost while improving the light transmission quantity.

In the above embodiment, when the imaging ray 110 is reflected for many times, the aberration will be easy to generate. For this reason, at least one of the first surface 211 and the fourth surface 222 is an aspherical surface. Aspheric surfaces can effectively eliminate aberration. The first surface 211 and the fourth surface 222 may both be aspherical surfaces, or one of them is an aspherical surface.

In addition, the first surface 211 and the fourth surface 222 may also be free curved surfaces, and the aberration formed by the imaging light ray 110 can also be eliminated by the free curved surfaces.

In an embodiment of the present disclosure, the second surface 212 and the third surface 221 have the same shape. The first lens 210 and the second lens 220 are glued together, and the second surface 212 and the third surface 221 are surfaces butting against each other. If they have the same shape, when they are butted and glued, the gap between them can be reduced, and thus they can be butted and glued more compactly.

As shown in FIG. 3, in the above embodiment, the second surface 212 and the third surface 221 are flat surfaces, the focal power of the first lens 210 is defined as φ1 and satisfies 0<φ1<0.06, the focal power of the second lens 220 is defined as φ2 and satisfies −0.01<φ2<0, the thickness of the first lens 210 is defined as T1 and satisfies 2.0 mm<T1<8.0 mm, the thickness of the second lens 220 is defined as T2 and satisfies 2.0 mm<T2<5.0 mm, and the imaging light path has an optical distortion less than 30%, a chromatic aberration less than 70 μm and an angle of view greater than 90°. When the second surface 212 and the third surface 221 are flat surfaces, they can be accurately butted and more closely attached. The thickness of the first lens 210 refers to the distance from the first surface 211 to the second surface 212 at the center point position of the first lens 210; the thickness of the second lens 220 refers to the distance from the third surface 221 to the fourth surface 222 at the center point position of the second lens 220. By selecting the focal power φ1 of the first lens 210 between 0 and 0.06, and the focal power φ2 of the second lens 220 between −0.01 to 0, the optical distortion of the imaging light path can be less than 30%, the chromatic aberration can be less than 70 μm, and the angle of view can be greater than 90°.

Specifically, for example,

TABLE 1

| surface | type | radius | thickness | material | conic constant | A4 | A6 |
| --- | --- | --- | --- | --- | --- | --- | --- |
| fourth surface | even order aspheric surface | −433.569 | 2.159 | OKP1 | 0 | 3.935E−05 | −1.815E−06 |
| first surface | even order aspheric surface | −52.571 | −7.9 | APL50 13VH | −0.58298 | 2.109E−06 | −7.682E−08 |

The even order aspheric coefficients satisfy the following equation:

$$z = \frac{CY^2}{1 + \sqrt{1 - (1+k)C^2Y^2}} + \sum_{i=2}^{N} \alpha_i Y^{2i}$$

where z is a coordinate along the optical axis, Y is a radial coordinate in the unit of lens length, C is the curvature (1/R), and k is the conic constant, $\alpha_i$ is the coefficient of each higher-order term, and 2i is the order of aspheric coefficient.

Figure 6:
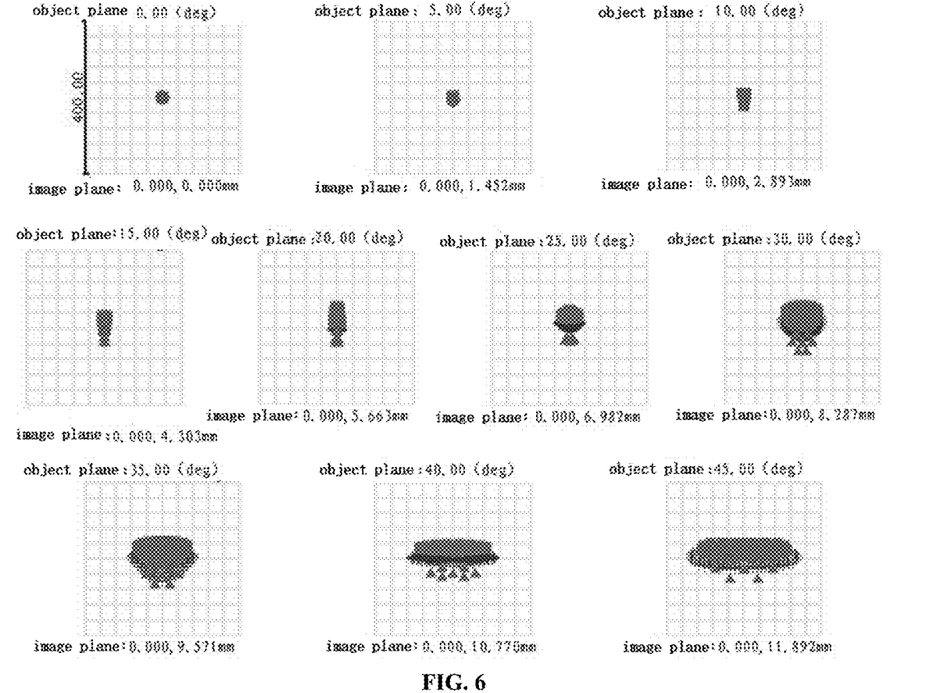
FIG. 6 is a spot diagram of the imaging light path in FIG. 1.

According to the above embodiment and referring to FIG. 6, the spot diagram of this embodiment refers to that, after the light ray emitted from a point passes through the image display structure, due to aberration, its intersection points with the image plane is no longer converged at the same point but scattered in a certain range. It is used to evaluate the image quality of the image display structure. Areas 1 to 10 are arranged from left to right and from top to bottom. It can be seen that the image height corresponding to the maximum half field of view is less than 11.892 mm.

Figure 7:
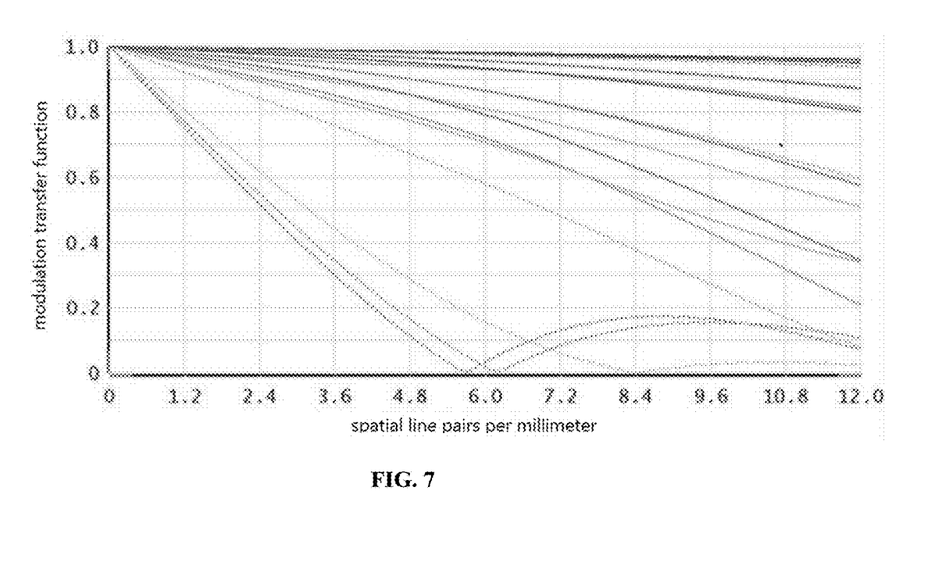
FIG. 7 is a modulation transfer function curve of the imaging light path in FIG. 1.

FIG. 7 shows the modulation transfer function curve (i.e., MTF chart) of this embodiment. The MTF diagram refers to the relationship between the modulation degree and the line pairs per millimeter in the image, and is used to evaluate the restoration ability of the scene details. The uppermost black solid line is a curve without aberration in theory, and the closer to the black solid line, the better the imaging quality will be. Although the curves in FIG. 7 are scattered, most curves are close to the black solid line, which meets the design specifications.

Figure 8:
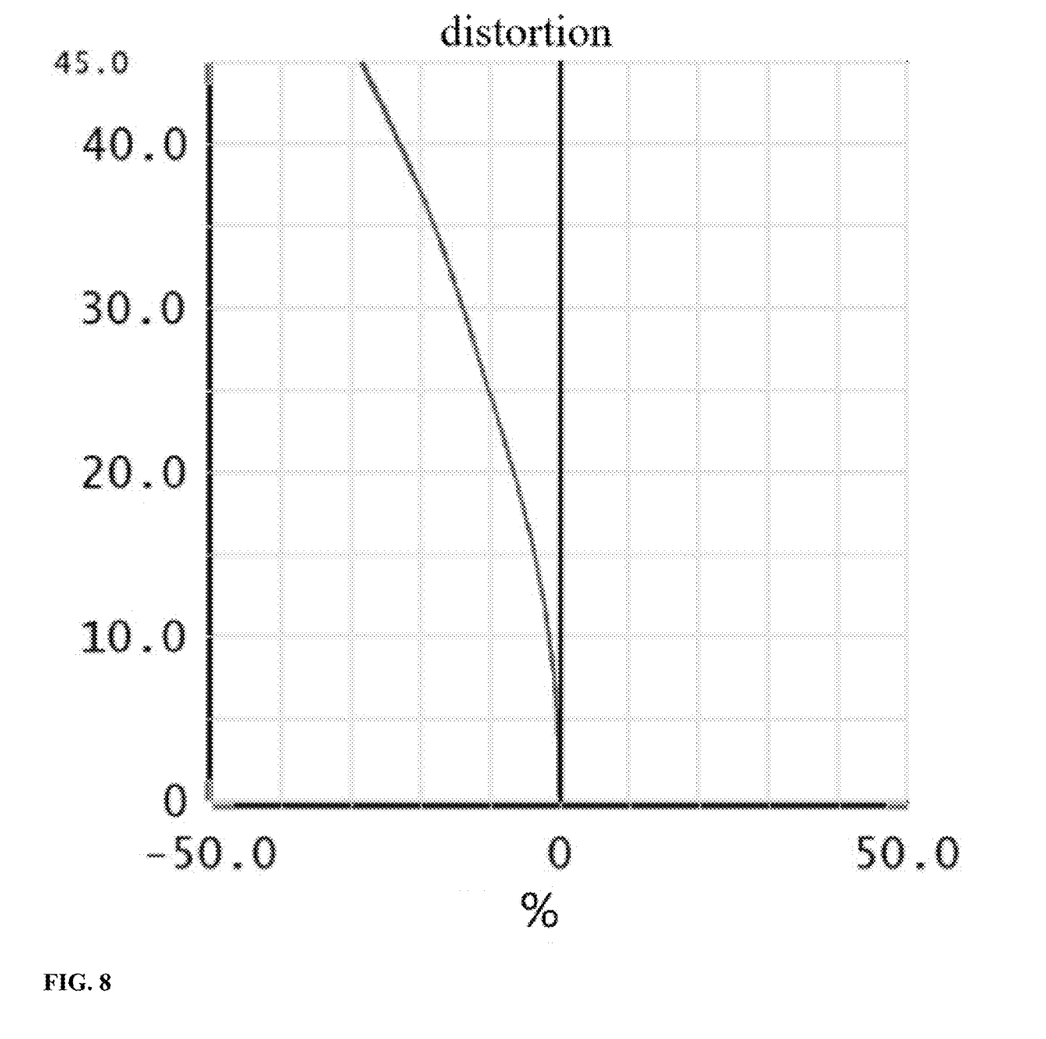
FIG. 8 is a distortion diagram of the imaging light path in FIG. 1.

FIG. 8 shows the distortion diagram in this embodiment. Distortion refers to that when the object is imaged by the image display structure, different parts of the object have aberrations with different magnification. Distortion will lead to reduced similarity between the object and the image, but will not affect the resolution of the image. It can be seen from FIG. 8 that the optical distortion at the maximum field of view is viarable in the range of less than 30%, and the distortion is small, which meets the design requirements.

Figure 9:
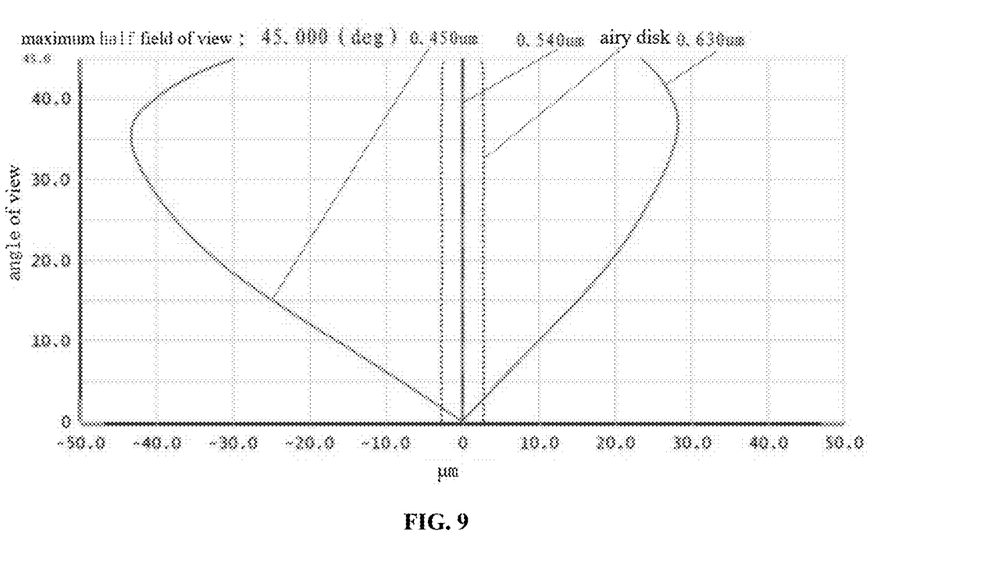
FIG. 9 is a lateral chromatic aberration diagram of the imaging light path in FIG. 1.

FIG. 9 shows the lateral chromatic aberration diagram in this embodiment. The lateral chromatic aberration, also known as the chromatic difference of magnification, mainly refers to that a polychromatic main ray of the object side becomes multiple rays when exiting from the image side due to the dispersion of the refraction system. It can be seen that the maximum position of the field of view with maximum dispersion is less than 70 μm, which can meet the needs of end users later on.

Figure 4:
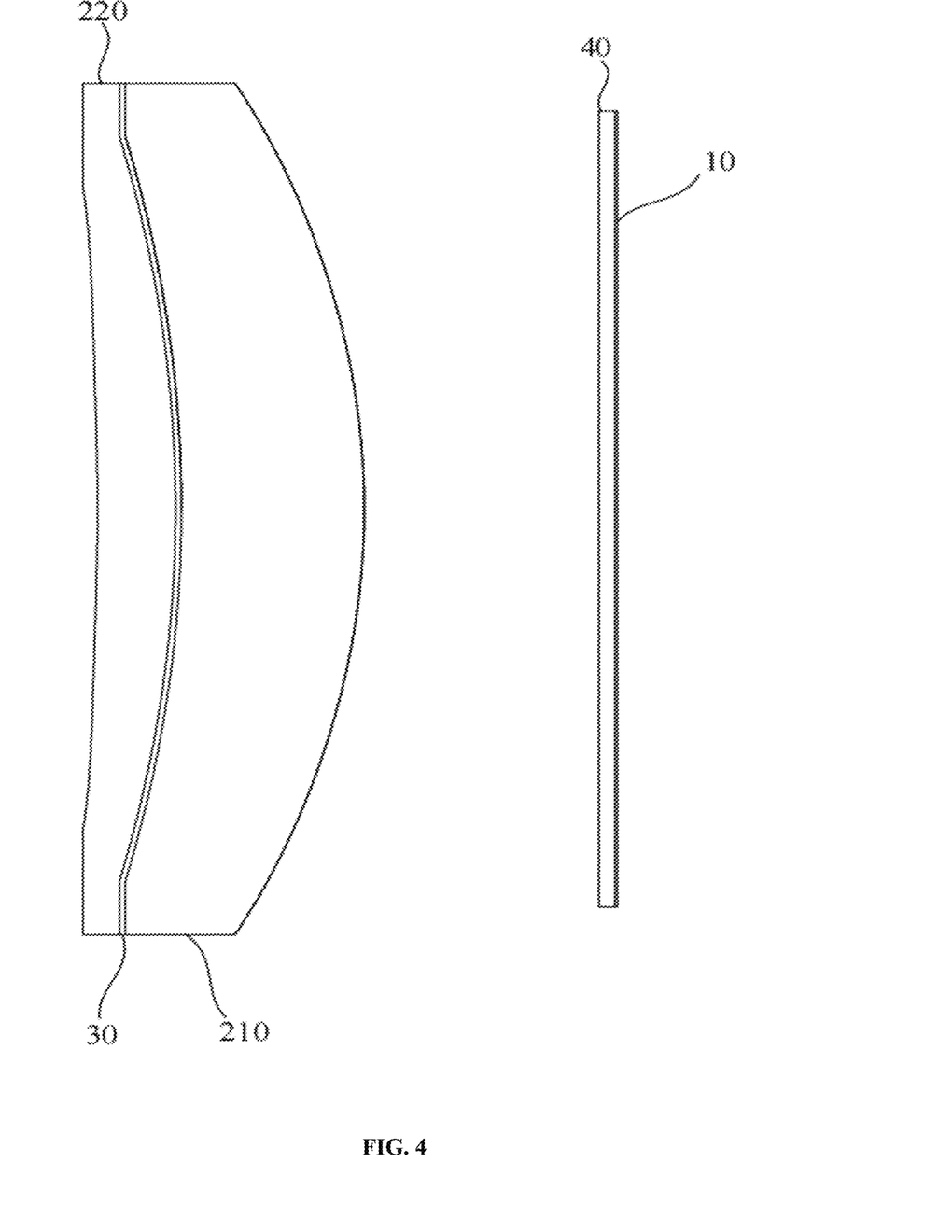
FIG. 4 is a schematic diagram of the structure of another embodiment of an imaging light path according to the present disclosure.
Figure 5:
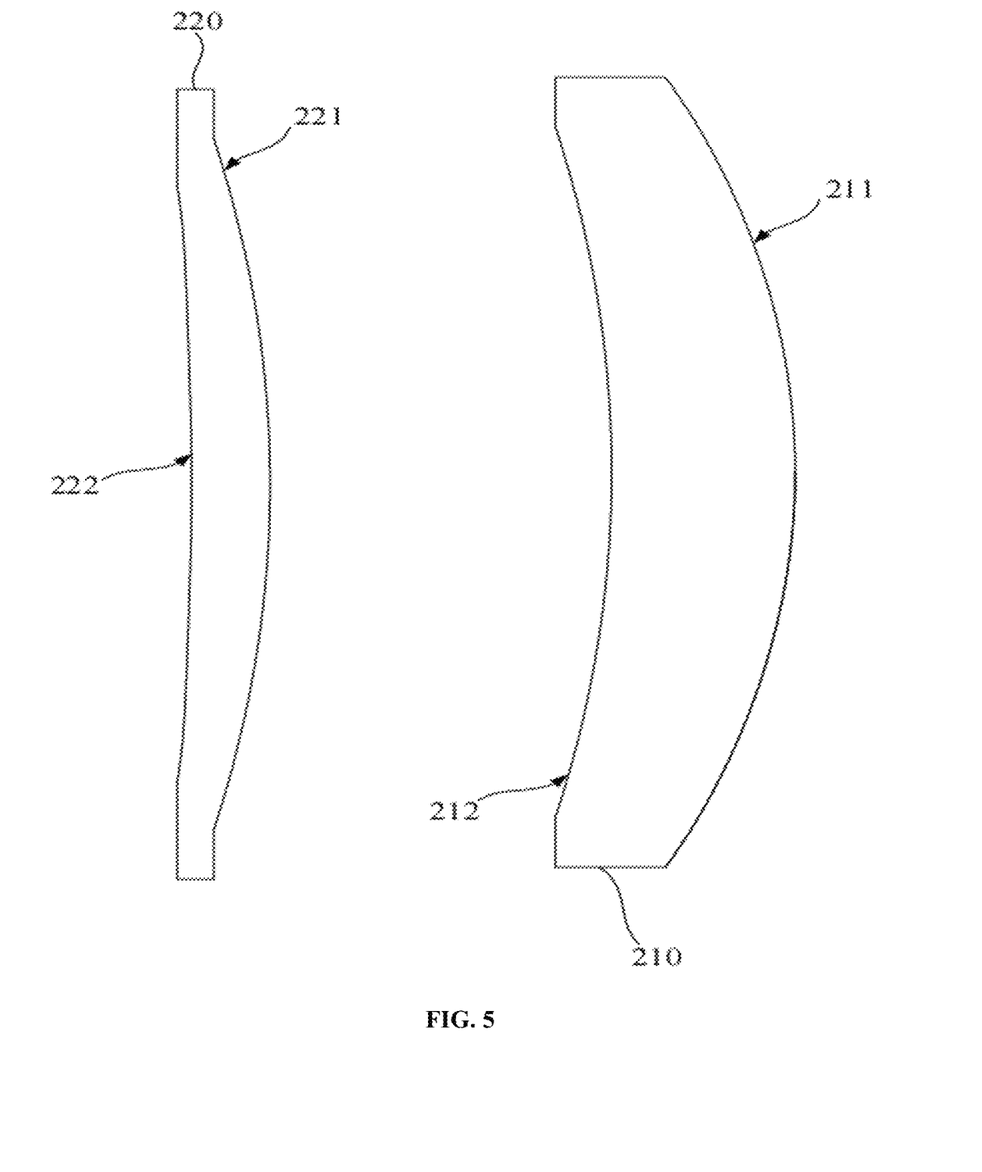
FIG. 5 is a schematic diagram of the structure of a first lens and a second lens in FIG. 4.

As shown in FIGS. 4 and 5, in an embodiment of the present disclosure, the second surface 212 and the third surface 221 are aspherical surfaces, and the second surface 212 and the third surface 221 bulge toward the display screen 10. The focal power of the first lens is defined as φ3 and satisfies 0<φ3<0.1, the focal power of the second lens is defined as φ4 and satisfies 0<φ4<0.005, the thickness of the first lens is defined as T3 and satisfies 2.0 mm<T3<5.0 mm, the thickness of the second lens is defined as T4 and satisfies 2.0 mm<T4<8.0 mm, and the imaging light path has a chromatic aberration less than 190 μm and an angle of view greater than 100°. The second surface 212 and the third surface 221 are aspherical, which can further eliminate the imaging aberration. The thickness of the first lens 210 refers to the distance from the first surface 211 to the second surface 212 at the center point position of the first lens 210; the thickness of the second lens 220 refers to the distance from the third surface 221 to the fourth surface 222 at the center point position of the second lens 220. By selecting the focal power φ3 of the first lens 210 between 0 and 0.1, and the focal power φ4 of the second lens 220 between 0 and 0.005, the optical distortion of the imaging light path can be less than 30%, the chromatic aberration can be less than 190 μm, and the angle of view can be greater than 100°.

Figure 10:
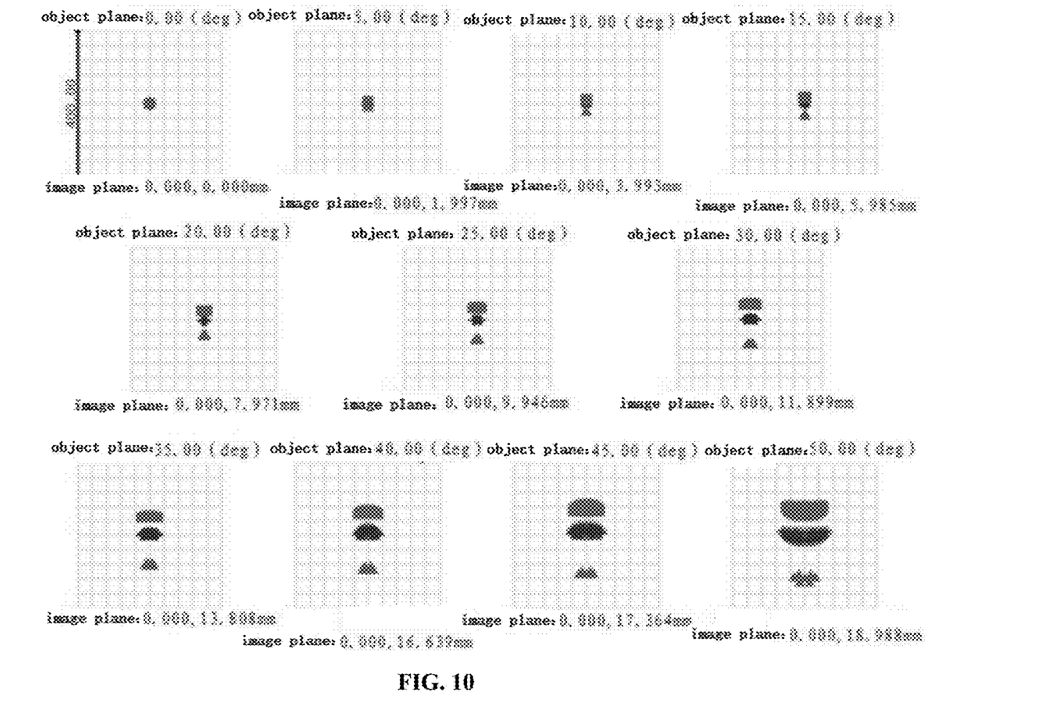
FIG. 10 is a spot diagram of the imaging light path in FIG. 4.

Specifically, for example,

According to the above embodiment and referring to FIG. 10, the spot diagram of this embodiment refers to that, after the light ray emitted from a point passes through the image display structure, due to aberration, its intersection points with the image plane is no longer converged at the same point but scattered in a certain range. It is used to evaluate the image quality of the image display structure. Areas 1 to 11 are arranged from left to right and from top to bottom. It can be seen that the image height corresponding to the maximum half field of view is less than 18.988 mm.

Figure 11:
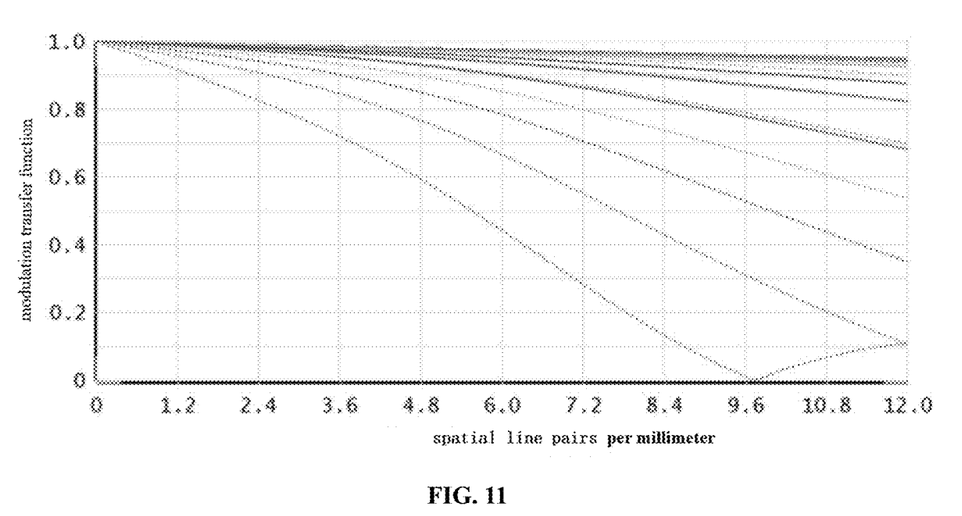
FIG. 11 is a modulation transfer function curve of the imaging light path in FIG. 4.

FIG. 11 shows the modulation transfer function curve (i.e., MTF chart) of this embodiment. The MTF diagram refers to the relationship between the modulation degree and the line pairs per millimeter in the image, and is used to evaluate the restoration ability of the scene details. The uppermost black solid line is a curve without aberration in theory, and the closer to the black solid line, the better the imaging quality will be. Although the curves in FIG. 11 are scattered, most curves are close to the black solid line, which meets the design specifications.

Figure 12:
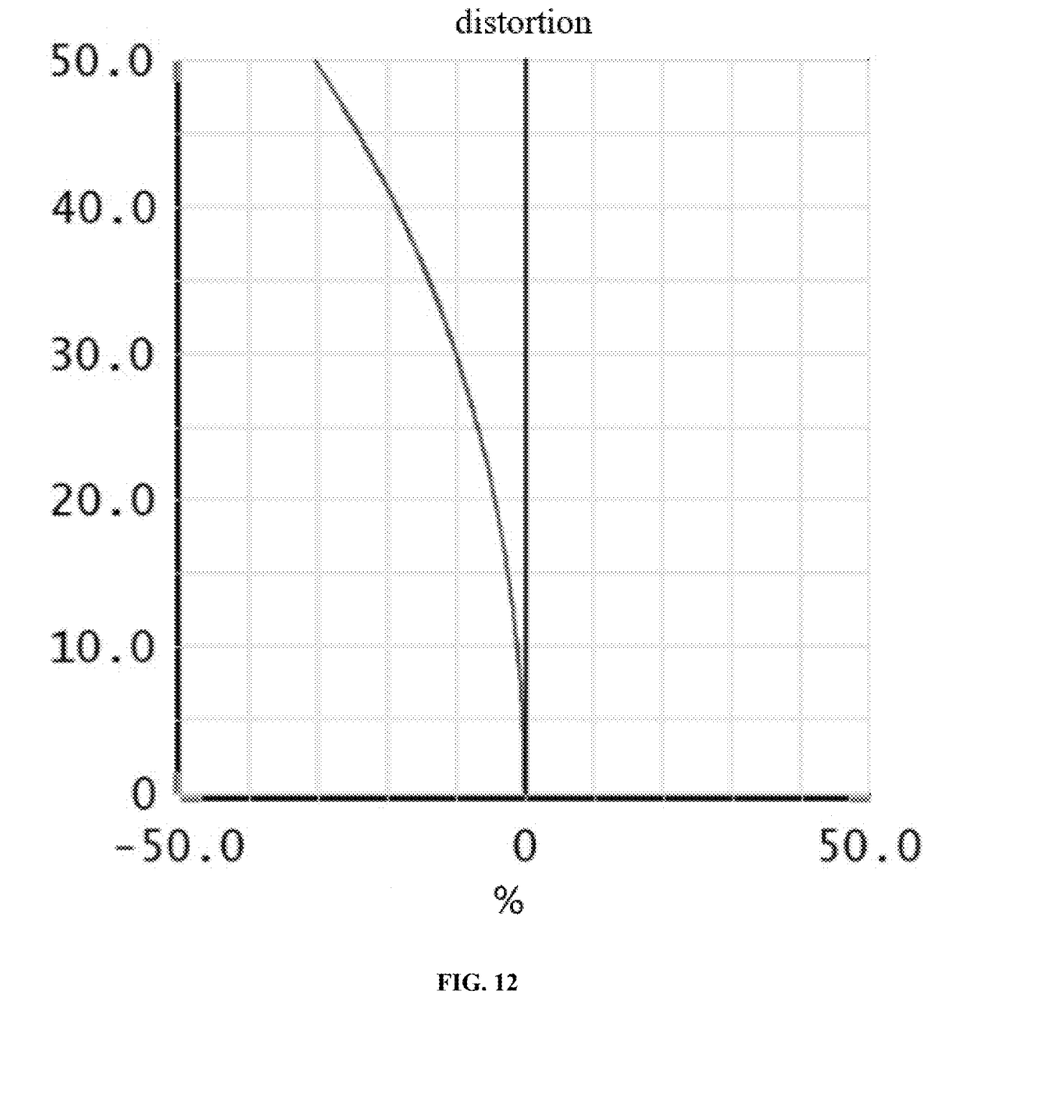
FIG. 12 is a distortion diagram of the imaging light path in FIG. 4.

FIG. 12 shows the distortion diagram in this embodiment. Distortion refers to that when the object is imaged by the image display structure, different parts of the object have aberrations with different magnification. Distortion will lead to reduced similarity between the object and the image, but will not affect the resolution of the image. It can be seen from FIG. 12 that the optical distortion at the maximum field of view is viarable in the range of less than 30%, and the distortion is small, which meets the design requirements.

Figure 13:
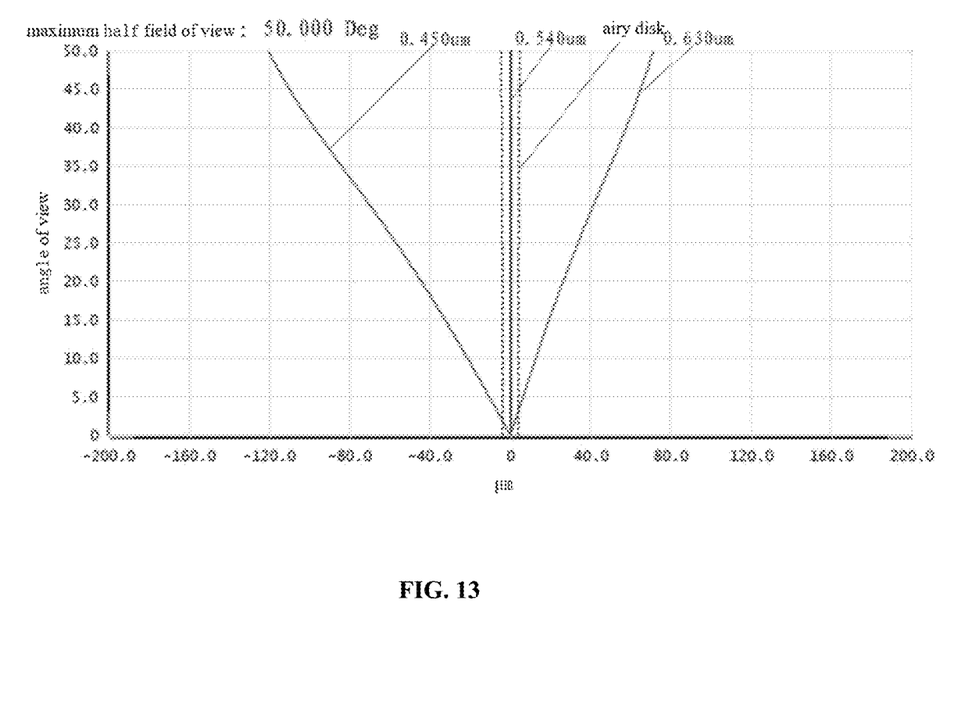
FIG. 13 is a lateral chromatic aberration diagram of the imaging light path in FIG. 4.

FIG. 13 shows the lateral chromatic aberration diagram in this embodiment. The lateral chromatic aberration, also known as the chromatic difference of magnification, mainly refers to that a polychromatic main ray of the object side becomes multiple rays when exiting from the image side due to the dispersion of the refraction system. It can be seen that the maximum position of the field of view with maximum dispersion is less than 190 which can meet the needs of end users later on.

In the above embodiment, the glued film layer 30 further comprises a glued layer 320, which is disposed between the quarter wave plate 310 and the reflective polarizing film 330.

TABLE 2

| surface | type | radius | thickness | material | conic constant | A4 | A6 |
|---|---|---|---|---|---|---|---|
| fourth surface | even order aspheric surface | −155 | 3.4209 | APL50 13VH | 0 | 1.813E−05 | −6.805E−08 |
| second surface | even order aspheric surface | −80 | 0 | | 0 | 0 | 0 |
| first surface | even order aspheric surface | −46.716 | −8.009 | APL50 13VH | −0.81494 | 2.152E−06 | 9.155E−10 |

The even order aspheric coefficients satisfy the following equation:

$$z = \frac{CY^2}{1+\sqrt{1-(1+k)C^2Y^2}} + \sum_{i=2}^{N} \alpha_i Y^{2i}$$

where z is a coordinate along the optical axis, Y is a radial coordinate in the unit of lens length, C is the curvature (1/R), and k is the conic constant, ai is the coefficient of each higher-order term, and 2i is the order of aspheric coefficient.

The glued layer 320 is sticky, and the quarter wave plate 310 and the polarizing reflection film 330 can be glued together by the glued layer 320.

In the above embodiment, the imaging light path comprises a calibration assembly. The calibration assembly is connected to the glued lens group 20, and is configured to adjust the distance between the glued lens group 20 and the display screen 10. The calibration assembly can drive the glued lens group 20 to move close to or far from the display screen 10. The imaging position of the imaging light path can be changed by adjusting the distance between the glued lens group 20 and the display screen 10. In this way, the imaging light path can be applied to myopia or hyperopia. For example, the imaging light path can be adjusted within the range of 0° to 800° myopia.

The present disclosure also provides a head mounted display. The head mounted display comprises a housing and an imaging light path as described above, and the imaging light path is provided in the housing. If the imaging light path is provided in the housing, the housing can effectively protect the imaging light path, prevent dust from falling into the imaging light path, and also reduce water infiltration into the imaging light path to avoid imaging light path failure.

The specific embodiments of the head mounted display in the present disclosure may refer to the above embodiments of the imaging light path, and will not be repeated here.

The above is only the preferred embodiment of the present disclosure, and does not limit the patent scope of the present disclosure. Any equivalent structural substitution made based on the description and drawings of the present disclosure, or direct/indirect application in other related technical fields without going beyond the inventive concept of the present disclosure, shall all be included in the patent protection scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An imaging system, comprising:
a display screen emitting an imaging light ray; and
a glued lens group disposed in an exit direction of the imaging light ray;
wherein the glued lens group comprises a first lens and a second lens arranged successively along a propagation direction of the imaging light ray;
a surface of the first lens facing the display screen is a first surface, and the first surface bulges toward the display screen;
the first surface is provided thereon with a semi-reflective and semi-transmissive film, a glued film layer is provided between the first lens and the second lens, and the glued film layer comprises a quarter wave plate and a reflective polarizing film arranged successively along the propagation direction of the imaging light ray,
wherein a surface of the first lens facing away from the display screen is a second surface, and the quarter wave plate is provided on the second surface;
a surface of the second lens facing the first lens is a third surface, the glued film layer further comprises a polarizing film, the polarizing film is provided on the third surface, and the reflective polarizing film is provided on a side of the polarizing film facing the first lens.

2. The imaging system according to claim 1, wherein a surface of the second lens facing away from the first lens is a fourth surface, and at least one of the second surface, the third surface and the fourth surface is provided thereon with an anti-reflection film.

3. The imaging system according to claim 2, wherein at least one of the first surface and the fourth surface is an aspherical surface.

4. The imaging system according to claim 1, wherein the second surface and the third surface have a same shape.

5. The imaging system according to claim 4, wherein the second surface and the third surface are flat surfaces, a focal power of the first lens is defined as φ1 and satisfies 0<φ1<0.06, a focal power of the second lens is defined as φ2 and satisfies −0.01<φ2<0, a thickness of the first lens is defined as T1 and satisfies 2.0 mm<T1<8.0 mm, a thickness of the second lens is defined as T2 and satisfies 2.0 mm<T2<5.0 mm, and the imaging system has an optical distortion less than 30%, a chromatic aberration less than 70 μm and an angle of view greater than 90°.

6. The imaging system according to claim 4, wherein the second surface and the third surface are aspherical surfaces, the second surface and the third surface bulge toward the display screen, a focal power of the first lens is defined as φ3 and satisfies 0<φ3<0.1, a focal power of the second lens is defined as φ4 and satisfies 0<φ4<0.005, a thickness of the first lens is defined as T3 and satisfies 2.0 mm <T3<5.0 mm, a thickness of the second lens is defined as T4 and satisfies 2.0 mm<T4 <8.0 mm, and the imaging system has a chromatic aberration less than 190 μm and an angle of view greater than 100°.

7. The imaging system according to claim 1, wherein the glued film layer further comprises a glued layer, and the glued layer is disposed between the quarter wave plate and the reflective polarizing film.

8. The imaging system according to claim 1, further comprising a calibration assembly, wherein the calibration assembly is connected to the glued lens group and configured to adjust a distance between the glued lens group and the display screen.

9. A head mounted display comprising a housing and an imaging system according to claim 1 disposed in the housing.

10. The imaging system according to claim 2, wherein the glued film layer further comprises a glued layer, and the glued layer is disposed between the quarter wave plate and the reflective polarizing film.

11. The imaging system according to claim 3, wherein the glued film layer further comprises a glued layer, and the glued layer is disposed between the quarter wave plate and the reflective polarizing film.

12. The imaging system according to claim 4, wherein the glued film layer further comprises a glued layer, and the glued layer is disposed between the quarter wave plate and the reflective polarizing film.

13. The imaging system according to claim 5, wherein the glued film layer further comprises a glued layer, and the glued layer is disposed between the quarter wave plate and the reflective polarizing film.

14. The imaging system according to claim 6, wherein the glued film layer further comprises a glued layer, and the glued layer is disposed between the quarter wave plate and the reflective polarizing film.

15. The imaging system according to claim 2, further comprising a calibration assembly, wherein the calibration assembly is connected to the glued lens group and configured to adjust a distance between the glued lens group and the display screen.

16. The imaging system according to claim 3, further comprising a calibration assembly, wherein the calibration assembly is connected to the glued lens group and configured to adjust a distance between the glued lens group and the display screen.

17. The imaging system according to claim 4, further comprising a calibration assembly, wherein the calibration assembly is connected to the glued lens group and configured to adjust a distance between the glued lens group and the display screen.

\* \* \* \* \*